Feb. 22, 1938.  F. C. BRADY  2,108,844
STEREOPTICON SLIDE AND PROJECTION APPARATUS THEREFOR
Filed Nov. 4, 1935
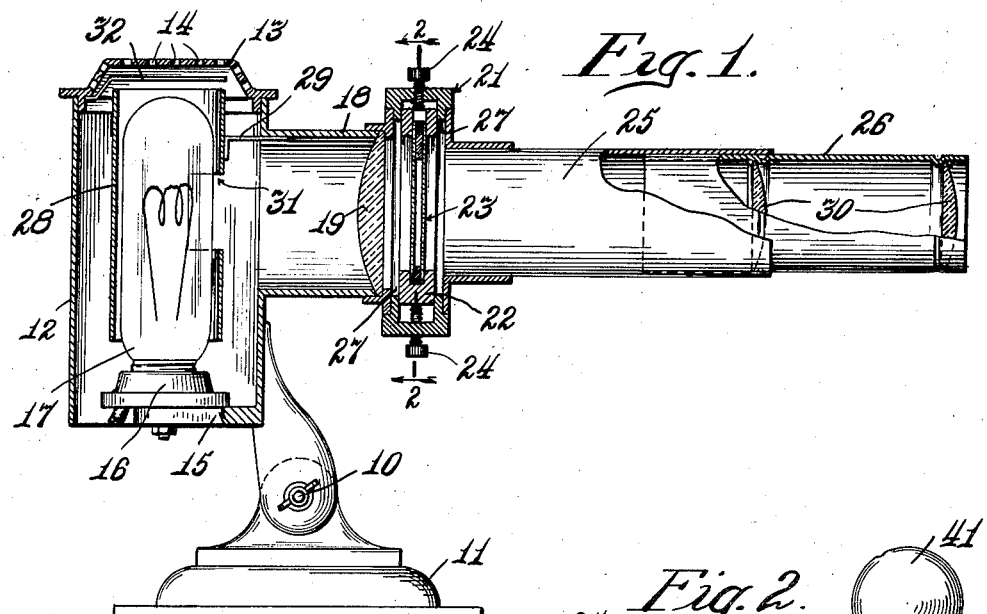
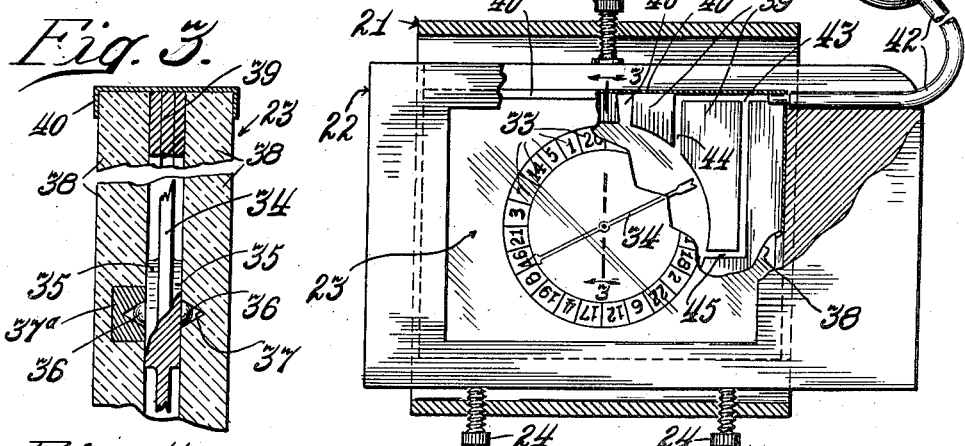
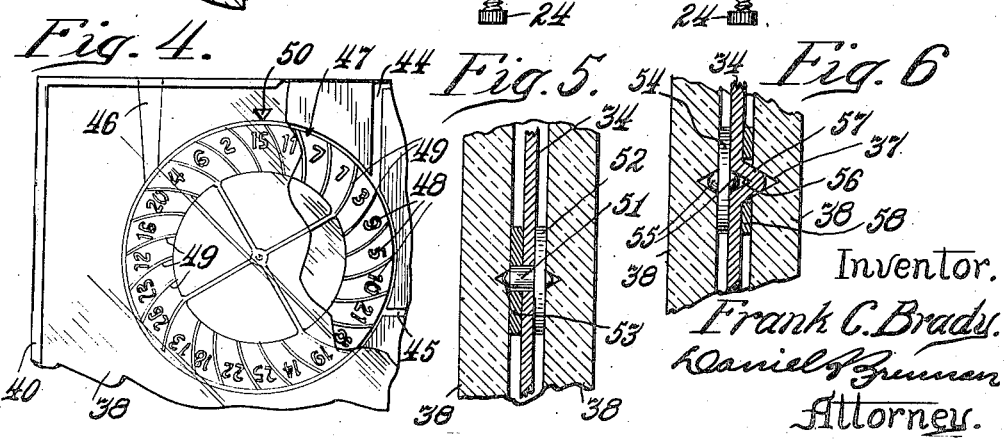
Inventor.
Frank C. Brady.
Daniel J. Brennan
Attorney.

Patented Feb. 22, 1938

2,108,844

UNITED STATES PATENT OFFICE 2,108,844

STEREOPTICON SLIDE AND PROJECTION APPARATUS THEREFOR

Frank C. Brady, Chicago, Ill.

Application November 4, 1935, Serial No. 48,099
In Canada February 6, 1935

4 Claims. (Cl. 88—26)

The invention relates to improvements in stereopticon slides and projector apparatus, including a chance device; and more especially to an air cooled projector apparatus and a slide embodying an animated chance device, by which, when light rays are projected through said slide, the operation of the chance device is projected at a point remote from the projector, such as on a screen.

An object of the invention is to provide an improved portable air cooled light ray projector machine particularly adapted for projecting light rays through a stereopticon slide embodying a chance device.

Another object is to provide novel means to prevent overheating or cracking the slide.

Another object is to provide a novel spinner, having indicating characters thereon, for co-operation with a fixed indicator of a stereopticon slide.

Another object is to provide a stereopticon slide of the character referred to with an improved spinner mounting.

Another object is to provide novel means in a light ray projector machine to adjust the slide relative thereto.

The foregoing and such other objects of the invention as will appear hereinafter as the description proceeds, will be more readily understood from a perusal of the following specification, reference being had to the accompanying drawing, in which:

Fig. 1 is a vertical sectional view, partly in elevation, of the improved light ray projector machine, showing a slide in operative position.

Fig. 2 is a sectional view taken on line 2—2 of Fig. 1, showing the receptacle, the slide and a slide holder partly in elevation.

Fig. 3 is a fragmentary sectional view of the slide taken on line 3—3 of Fig. 2, showing one form of pivotal mounting for the spinner.

Fig. 4 is a fragmentary view similar to Fig. 2, showing a modified form of stereopticon slide.

Fig. 5 is a view similar to Fig. 3 showing a modified form of mounting for the spinner; and Fig. 6 is a view similar to Fig. 5 showing another form of spinner mounting.

The portable light ray projector machine shown in the drawing is designed especially for use in conjunction with the improved stereopticon slide embodying a chance device of the type shown in this application and in the Patent No. 1,584,531, to H. L. Hagan dated May 11, 1926 which is assigned to applicant. Although slides of ordinary construction also may be used in this as in prior art machines, the present machine is designed especially for use with the slide of the type of the present invention. The slide of the present invention remains in the machine a considerable length of time, therefore, if a machine lacking the improvements of the present invention is used, the heat generated would tend to crack the slide. The objections to prior structures have been overcome, by providing, as will be more fully explained hereinafter, means to permit air to circulate freely on both sides of the slide, and a receptacle for the slide spaced further from the light source than in projectors designed for ordinary slides, which remain adjacent the heat area but an instant.

As shown, the projector proper is mounted as at 10 on a base 11 for pivotal adjustment through a vertical plane. A substantially rectangular vertically disposed housing 12, open at both ends, is provided with a cover 13, having numerous openings 14 therein to allow free circulation of air therethrough to dissipate the heat. A flange 15, preferably extending inwardly, at the bottom, from one wall of the housing 12, carries a light socket 16 adapted to receive a lamp 17.

A tubular extension 18, having a lens 19 mounted at its outer end, projects outwardly a short distance from one wall of the housing 12 and has a receptacle 21 connected to its outer end. As clearly illustrated in Figs. 1 and 2, the receptacle 21 preferably is formed substantially rectangular to receive a holder 22, which carries the stereopticon slide assembly 23, and has a plurality of adjusting screws 24 to insure proper alignment of the stereopticon slide, with the extension 18. A telescopic tubular lens holder 25—26 containing lens 30, projects outwardly from the face of the receptacle 21 in axial alignment with the extension 18. It is obvious that the position of the receptacle 21 and the structure of the ventilated housing 12 are such that the slide is not subjected to the direct heat of the lamp 17. To further guard against damage to the slide, the inside faces of the walls of the receptacle 21 are recessed, as at 27, to permit free circulation of air on both faces of the slide 24. A shield 28, arranged around the lamp 17, preferably is suspended within the lamp housing 12, by a bracket 29. The shield has an opening 31 on one side to permit the light rays to pass into the tubular extension 18. A light ray shield 32 is carried in the cover 13 spaced from the top thereof so as not to obstruct openings 14.

The stereopticon slide best illustrated in Fig. 2 is of the type embodying an animated chance device, preferably consisting of a series of indicating characters 33 arranged equi-distant from a common center, and a spinner 34 arranged therein to rotate about said center to co-operate with said characters while the light rays are being projected through said slide upon a screen, whereby the operation of the chance device can be observed. An example of use is for instance, in a moving picture theater, where an award is made to the holder of a number or other character at which the spinner stops. Each observer is given a card containing a series of characters and upon each spinning of the spinner, the character at which the spinner finally rests is checked upon the card having that character, and when, after successive spinnings of the spinner, all characters on a single card have been checked, the game is terminated.

As shown in Fig. 3, the spinner 34 preferably has a boss 35 on each side thereof and a trunnion 36 extending outwardly from each boss, one adapted to be seated in a bearing 37 formed in one face of one glass plate 38 and the other in a bearing block 37a set in the opposite glass plate 38. Each plate 38 may be provided with bearing 37 or bearing block 37a, as alternate constructions. The plates 38 are held in spaced relation by a suitable spacer sheet 39 (Fig. 2) which preferably fills all the space between the plates except that required to allow spinning of the spinner 34. A binding tape 40 holds the plates together. The spinner preferably is spun by a blast of fluid, preferably air, generated by squeezing a bulb 41, provided on one end of a connecting rubber tubing 42. The other end of said tubing communicates with a passage 43 provided between the glass plates 38. To insure proper distribution of the air forced between the plates, the passage 43 preferably branches off into passages 44 and 45 which open, substantially at right angles to each other, into the space around the spinner. It is obvious that while air is being forced through passages 44—45 the spinner is rapidly rotated regardless of the position in which it may have stopped after its preceding operation. The spent air may escape through a port 46 (Fig. 4) or otherwise leak out.

Another form of chance device, shown in Fig. 4, may consist of a suitable translucent spoked wheel 47, having indicating characters 48, preferably cut out equi-distant from the center of rotation to allow passage of light rays therethrough. The wheel 47 is adapted to be spun in the same manner as the spinner 34 previously described and to this end, the wheel preferably has a plurality of curved radial vanes 49 extending inwardly a short distance from its circumferential edge to receive the impact of the air blast ejected through passages 44—45. A visible indicator 50 provided in this type of stereopticon slide, indicates the character to be considered by the observer. The wheel 47 may be pivotally mounted in the manner shown in Fig. 3 or other suitable mountings may be employed, such as are shown, by way of example, in Figs. 5 and 6, for either the spinner or the wheel. A disk may be used instead of the wheel 47 and either may be transparent with opaque indicating characters and an opaque indicator may be used.

The loose pivot mounting illustrated in Fig. 5 includes a trunnion 51, having a flange 52 adjacent one end, adapted to be held non-rotatably between the spaced plates 38. The spinner 34 or wheel 47 is rotatably mounted on the trunnion 51 and a spacing washer 53 prevents wobbling of the spinner or wheel.

The mounting shown in Fig. 6, includes a bearing plate 54 having a trunnion 55 on opposite faces, one adapted to fit into a bearing in one of the glass plates 38 and the other to engage in an axial recess 56 provided in the adjacent face of the spinner 34. An axial projection 57 formed on the opposite face of said spinner is adapted to be seated in a bearing 37 in the other glass plate 38 and a spacing washer 58 is fitted over said projection to insure stability.

Although exemplary forms of streopticon slides and pivotal mountings for the rotor have been shown and described, it is to be understood that the improved spaced plate assembly embodying a chance device may be used apart from a light ray projector and that each assembly may embody variations in detail structure without departing from the spirit of the invention or the scope of the appended claims.

I claim:

1. A slide adapted to be held in a receptacle of a light ray projector, including spaced transparent plates having an air inlet and outlet therebetween, a fixed indicator associated with said plates, an opaque spinner pivotally mounted between said plates, vanes on said spinner, and a series of transparent indicating characters on said spinner all substantially equi-distant from its center of rotation and arranged to pass adjacent said fixed indicator as air is forced through the inlet against said vanes to rotate the spinner, whereby the operation of the spinner can be visibly projected upon a screen.

2. A slide adapted to be held in a receptacle of a light ray projector, including spaced transparent plates, a fixed indicator mounted between said plates, a spinner rotatably mounted between said plates, a plurality of circumferentially spaced vanes mounted on said spinner, and a series of indicating characters on said spinner all substantially equi-distant from its center of rotation and arranged to pass adjacent said fixed indicator as the spinner is rotated, whereby the operation of the spinner can be projected upon a screen.

3. A slide, including a pair of spaced parallel transparent plates, means holding said plates in spaced relation for movement bodily into or from the receptacle of a light ray projector, a fixed indicator mounted between said plates, a disk spinner pivotally mounted between said plates, a series of transparent indicating characters on said spinner arranged to pass adjacent said fixed indicator as the spinner is rotated, radial vanes on the spinner spaced between said characters, and means to discharge an air blast against said vanes for rotating the spinner, whereby the operation of the spinner may be projected upon a screen.

4. A slide, including spaced transparent plates, aligned bearings in said transparent plates, a spinner having a bearing mounted between said plates, a trunnion on said spinner rotatably mounted in the bearing in one of said plates, a bearing plate having a trunnion mounted in the bearing in the other plate, a second trunnion on said bearing plate to engage in the bearing in said spinner, a plurality of spaced air passages in said slide for discharging air in different directions in the plane of rotation of said spinner, and means for creating a blast of air through said passages and against the spinner to impart movement thereto.

FRANK C. BRADY.